3,516,969
ADAMANTANE COPOLYCARBONATES
Mary Ellen Hoagland, Philadelphia, and Irl N. Duling, West Chester, Pa., assignors to Sun Oil Company, Philadelphia, Pa., a corporation of New Jersey
No Drawing. Filed Mar. 18, 1969, Ser. No. 808,318
Int. Cl. C08g 17/13
U.S. Cl. 260—47
7 Claims

ABSTRACT OF THE DISCLOSURE

Copolycarbonates are prepared from a mixture of 2,2-bis (4-hydroxyphneyl) propane and 1,3-bis (4-hydroxyphenyl)-5,7- dimethyladamantane and phosgene which are useful for preparing films, fibers and molded articles having excellent temperature characteristics.

---

The present invention relates to copolycarbonates wherein some of the repeating polymer units, i.e., $$-B-O-\overset{\overset{O}{\|}}{C}-O-$$

contain an adamantane bisphenol moiety of the structure

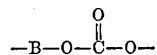

Adamantane (tricyclo[3.3.1.1$^{3,7}$] decane) has a carbon structure containing ten carbon atoms arranged in a completely symmetrical, strainless manner and is often described as a cagelike structure which consists of three condensed cyclohexane rings. There are four bridgehead carbon atoms which are equivalent to each other as are the rings. The adamantane structure is often depicted by:

Briefly stated, the present invention is a composition of matter consisting essentially of a copolycarbonate having the repeating structural unit $$-B-O-\overset{\overset{O}{\|}}{C}-O-$$

where B is selected from the group consisting of

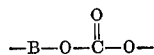

and

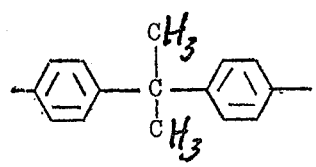

where R' and R" are radicals having 0 to 20 carbon atoms selected from the group consisting of hydrogen and hydrocarbyl, the mole ratio of

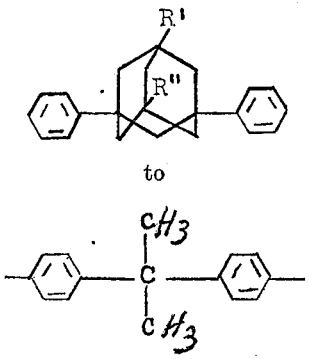

to

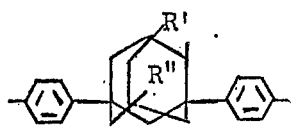

being in the range of 1:50 to 20:1 more preferably in the range of 1:20 to 1:1.

The term hydrocarbyl as used herein describes a monovalent hydrocarbon radical. Such hydrocarbyl radicals can be selected from the group consisting of alkyl, cycloalkyl, aryl, alkaryl, and aralkyl. A preferred structure is one in which at least one of R' and R" are hydrocarbyl radicals having 1 to 20 carbon atoms. Although the number of carbon atoms in each substituent radical can range up to 20, it is generally preferred that each of R' and R" contain no more than 10 carbon atoms. Most preferred are R' and R" selected from the group consisting of methyl and ethyl, because of the ease with which 1,3-dimethyl-1,3-diethyladamantane and 1-methyl-3-ethyl adamantane are obtained.

The polycarbonates of the present invention are prepared from adamantane bisphenols of the structure

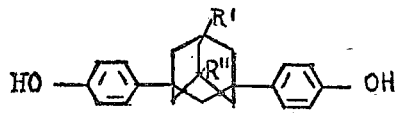

where R' and R" have the significance previously given, 2,2-bis (4-hydroxyphenyl) propane (bisphenol A) and phosgene in a cooled, sitrred mixture of a tertiary amine, such as pyridine or triethylene amine and a solvent for the copolycarbonate such as methylene chloride. The maximum molecular weight of polymer is usually achieved in about .5 to 2 hours. The optimum temperature is about 20–30° C. High temperatures reduce the reaction time and result in lower polymer inherent viscosity ($\eta$ inh.) Other conventional procedures such as an aqueous interfacial process or an ester interchange can be employed to produce the present copolycarbonates.

In order to achieve the copolycarbonates of the present invention the reactant bisphenols are employed in a mole ratio of adamantane bisphenol to bisphenol A in the range of 1:50 to 20:1 or more preferably 1:20 to 1:1. The copolycarbonates tend to reflect the mole ratios of the reaction mixture. The sequence of structural units in the present copolycarbonates would be described as random.

The admantane bisphenols are described in commonly assigned U.S. patent application Ser. No. 802,661 filed Feb. 26, 1969, by Robert E. Moore and are prepared by reacting a compound of the structure

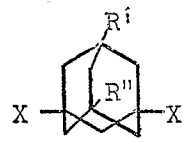

where R' and R" are as previously described and X is independently selected from the group consisting of bromo and chloro with an excess of phenol at a temperature in the range of 125 to 200° C. The reaction time for preparing the bisphenols will vary, particularly in regard to the temperature employed from 4 to 10 hours. In practice the preferred procedure is to carry out the reaction at reflux which is around 178–185° C. (B.P. phenol 182° C.). At reflux, the reaction requires 5 to 7 hours for good yields. No catalyst is required. The reaction takes place in an excess of phenol which also serves as the solvent for the adamantane reactant and product. The adamantane bisphenol is most easily recovered by cooling the reaction mixture and pouring it into warm water (66–80° C.) thus, precipating the bisphenol and dissolving the phenol. The crystalline material is filtered and recrystallized, for example, from xylene, tolune or isopropanol-water.

The adamantane hydrocarbons are well known and their preparation is adequately described in the literature.

The dihalo derivatives can be prepared by reacting the corresponding adamantane hydrocarbon with chlorine or bromine in the presence of $AlCl_3$ or $AlBr_3$ as disclosed in Stetter and Wulff; German Pat. No. 101,410 and Stetter in Angew Chem. International Edit., vol. 1 (1962), No. 6, pages 287–288. The mixed bromochloro adamantane can be obtained by reacting a dibromo adamantane with a chlorine donor such as carbon tetrachloride in the presence of a Lewis acid catalyst as shown in the co-pending application of Robert E. Moore, Ser. No. 688,679 filed Dec. 7, 1967.

Examples of such suitable reactants for preparing the adamantane bisphenols are the bridgehead dichloro, dibromo or bromochloro derivatives of the following hydrocarbons: adamantane, 1-methyladamantane; 1-ethyladamantane; 1,3-dimethyladamantane; 1-methyl-3-ethyladamantane; 1,3-diethyladamantane; 1-n-propyladamantane; 1-isopropyladamantane; 1-n-butyladamantane; 1,3-di-n-pentyladamantane; 1-methyl-3-heptyladamantane; 1-n-decyladamantane; 1-n-decyl-3-ethyladamantane; 1-methyl-3-propyladamantane; 1-isohexyladamantane; 1-methyl-3-cyclohexyladamantane; 1-phenyladamantane; 1-methyl-3-phenyl-adamantane; 1,3-diphenyladamantane; 1-p-tolyladamantane; 1-benzyladamantane and the like.

In the preparation of the adamantyl bisphenol, the following examples are presented to further illustrate the invention.

Example 1

32.2 grams (0.1 mole) of 1,3-dibromo-5,7-dimethyladamantane and 250 cc. of phenol were charged to a 500 ml., round-bottom flask equipped with a condenser. The flask was swirled to dissolve the dibromo adamantane. The flask was swirled to dissolve the dibromo adamantane. The flask and contents were then heated under reflux (~180° C.) for several hours (5–6 hours). After the evolution of HBr had subsided, the reaction mixture was cooled, poured into warm water (~75° C.) and stirred to remove phenol. A white crystalline material precipitated and was recovered by filtration. The product 29.6 grams (85% theoretical) was recrystallized from toluene. It was identified by I.R.; mass spectroscopy and N.M.R. as 1,3-bis(4-hydroxyphenyl)-5,7-dimethyladamantane. Its properties are set out in Table I.

TABLE I

| | |
|---|---|
| Molecular wt. | 348 |
| Melting point, ° C. | 223–223.5 |
| Heat of fusion, cal./mole | 9840 |
| Entropy of fusion, e.v. | 2.0 |
| Cryoscopic constant | 17.4 |

Example 2

The following were charged to a 400 cc. Morton flask equipped with a mechanical stirrer, thermometer, condenser and gas inlet tube:

6.96 g. 1,3 bis(4-hydroxyphenyl) 5,7-dimethyladamantane (0.02 mole)
4.56 g. bisphenol A (0.02 mole)
12.0 cc. pyridine (0.15 mole)
100–150 cc. methylene chloride.

Nitrogen was bubbled through the system for 15–20 minutes to flush out the air and to thoroughly blanket the system. Phosgene was then bubbled in, briskly at first to displace the nitrogen, then slowly. The reaction temperature was maintained at 25–30° C. during the reaction. The reaction solution became extremely viscous after 1.5 hours. The addition of phosgene was stopped and the system purged with nitrogen for one hour. The reaction mixture was diluted to a volume of 400 cc. with methylene chloride, washed with 10% HCl and followed by successive water washings until chloride ion could no longer be detected in the wash water. The methylene chloride solution was dried briefly over anhydrous calcium chloride and poured into a large excess of petroleum ether to precipitate the polymer. Filtration and air drying yielded 11.68 g. of copolycarbonate (93% of theoretical). The recovered polymer was redissolved in methylene chloride, filtered, reprecipitated from petroleum ether, vacuum dried for 48 hours at 50–60° C. to yield 10.84 g. (~86% yield) of copolycarbonate having an inherent viscosity ($\eta$ inh.) in methylene chloride at 100° of 0.76. The composition of the copolycarbonate, as determined from elemental analysis, was 50 weight percent of each comonomer. Some properties of the copolycarbonate as compared with those of the homopolycarbonates are set out in Table II. The bisphenol A polycarbonate is available commercially under the name Lexan.

Example 3

Using essentially the same procedure as in Example 2, the following materials were charged to a 250 cc. stirred flask:

10.5 g. 1,3-bis (4-hydroxyphenyl)-5,7-dimethyladamantane (0.03 mole)
8.0 cc. pyridine (0.10 mole)
~80 cc. methylene chloride The reaction was allowed to proceed for about 1.5 hours. The reaction mixture was then diluted to a volume of 250 cc. with methylene chloride and the homopolycarbonate precipitated as in Example 2. 10.53 g. of polycarbonate (94% of theoretical was recovered). After recrystallization 10 g. (90% of theoretical) of polycarbonate having an inherent viscosity ($\eta$ inh.) of 0.67 was recovered.

TABLE II.—PROPERTIES OF POLYCARBONATES

| Bisphenol | Bisphenol A | 1,3-bis(4-hydroxyphenyl)-5,7-dimethyl adamantane | Bisphenol A: 1,3-bis(4-hydroxyphenyl)5,7-dimethyl-adamantane |
|---|---|---|---|
| Mole ratio | 1 | 1 | 1:1 |
| Tg, ° C.: | | | |
| (DTA) | 150 | | 211–212 |
| (DSC) | | [1] 225–240 | |
| Melting temp., ° C. | 220–230 | Stable to 300 | |
| Decomposition temp., ° C. | | [2]>285 | [2]>250 |
| $\eta$inh | | 0.59 | 0.69 | 0.76 |
| $\eta D^{20}$ | 1.5850 | 1.578–1.582 | 1.582–1.586 |
| Density | 1.199 | 1.146 | 1.167 |
| Shore D hardness | 80±2 | 83±2 | 80±1 |
| Tensile properties: | | | |
| Stress, p.s.i. | 12,400 | 8,400 | 13,200 |
| Elongation, percent | 80 | 8 | 19 |
| Modulus, p.s.i. | 246,000 | 126,000 | 116,000 |

[1] Tg could not be clearly defined but appeared to be in the region indicated (differential scanning calorimetry).
[2] Temperature noted is that at which discoloration of sample began.

Inherent viscosities ($\eta$ inh.) were obtained at a concentration of 0.5 g./dl. at 100° F. Duplicate runs were made and flow times were reproducible within 0.2 second. Inherent viscosity is represented by the equation:

$$\eta_{inherent} = \frac{\ln \text{relative}}{C}$$

where:

$\eta$ relative $= t/t_0$
$t_0 =$ flow time of pure solvent (reference liquid) through a viscometer
$t =$ flow time through the same viscometer of dilute solution of polymer in reference liquid
$C =$ concentration of polymer in solution expressed in grams/deciliter The solvent employed was methylene chloride.

Tensile properties were measured in accordance with ASTM D-638-67T.

The copolycarbonates of the present invention can be used to prepare films, filaments and molded articles. They are particularly useful in those situations where high temperature properties are most important. Those copolycarbonates containing greater amounts of bisphenol A will exhibit tensile properties of the same order as the bisphenol A polycarbonates, yet will possess higher use temperatures.

The invention claimed is:

1. A composition of matter consisting essentially of copolycarbonate having the repeating structural unit

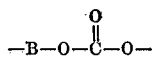

where B is selected from the group consisting of

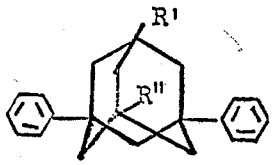

and

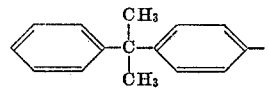

where R' and R" are radicals having 0 to 20 carbon atoms selected from the group consisting of hydrogen and hydrocarbyl, the mole ratio of

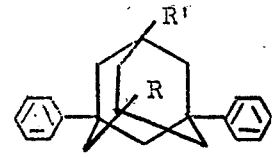

to

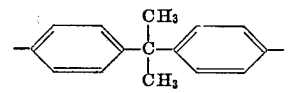

being in the range of 1:50 to 20:1.

2. The composition according to claim 1 wherein R' and R" are hydrocarbyl.

3. The composition according to claim 2 wherein the hydrocarbyl radical is selected from the group consisting of alkyl, cycloalkyl, aryl, alkaryl and aralkyl.

4. The composition according to claim 3 wherein the hydrocarbyl radical has 1-10 carbon atoms.

5. The composition according to claim 4 wherein R' and R" are selected from the group consisting of methyl and ethyl.

6. The composition according to claim 5 wherein R' and R" are methyl.

7. The composition according to claim 1 wherein the mole ratio is in the range of 1:20 to 1:1.

References Cited
UNITED STATES PATENTS 3,342,880  9/1967  Reinhardt _____ 260—648

SAMUEL H. BLECH, Primary Examiner

U.S. Cl. X.R.

260—33.8, 619, 648